United States Patent

[11] 3,537,530

| [72] | Inventors | Thomas S. Bettencourt<br>Walnut Grove, and<br>Fredrick L. Hill, Rio Vista, California |
|---|---|---|
| [21] | Appl. No. | 662,432 |
| [22] | Filed | Aug. 22, 1967 |
| [45] | Patented | Nov. 3, 1970 |
| [73] | Assignee | The Regents of the University of California<br>Berkeley, California |

[54] CUTTING DEVICE AND METHOD FOR TOMATO HARVESTERS AND THE LIKE
10 Claims, 6 Drawing Figs.

[52] U.S. Cl. .................................................. 171/1,
56/121.4, 171/62, 172/720
[51] Int. Cl. ........................................................ A01d 25/00
[50] Field of Search ........................................... 171/1, 22,
62, 101, 3, 9; 56/121.4, 121.41, 12.46, 229, 327;
172/19, 720

[56] References Cited
UNITED STATES PATENTS

| 846,323 | 3/1907 | Le Blanc ....................... | 56/229 |
| 1,280,156 | 10/1918 | Campbell ...................... | 56/121.4 |
| 1,344,966 | 6/1920 | Smith ............................ | 56/121.4 |
| 2,212,751 | 8/1940 | Powers et al. ................ | 56/121.46 |
| 2,641,099 | 6/1953 | Reynolds et al. ............. | 56/121.46 |
| 3,196,954 | 7/1965 | Hill et al. ...................... | 171/62 |
| 3,252,520 | 5/1966 | Hill et al. ...................... | 171/94 |

FOREIGN PATENTS

| 818,481 | 8/1959 | Great Britain................ | 56/121.46 |

Primary Examiner—Antonio F. Guida
Attorney—Owen, Wickersham & Erickson

ABSTRACT: The cutting device for harvesters of row crops comprises a pair of stingers, forwardly extending rods with an offset portion, and a blade on each stinger extending in therefrom, with the cutting edge extending forwardly for a short portion and then rearwardly for the major portion. The method embodies riding the stingers on the side walls of the bed, below the top, trapping and retaining the top bed shape and dimensions, with the blades extending in underground from the forward edge of the stinger, thereby cutting the full width of the bed with only narrow flat blades. The blades may overlap for single row beds, or may not overlap for double row beds.

Patented Nov. 3, 1970
3,537,530
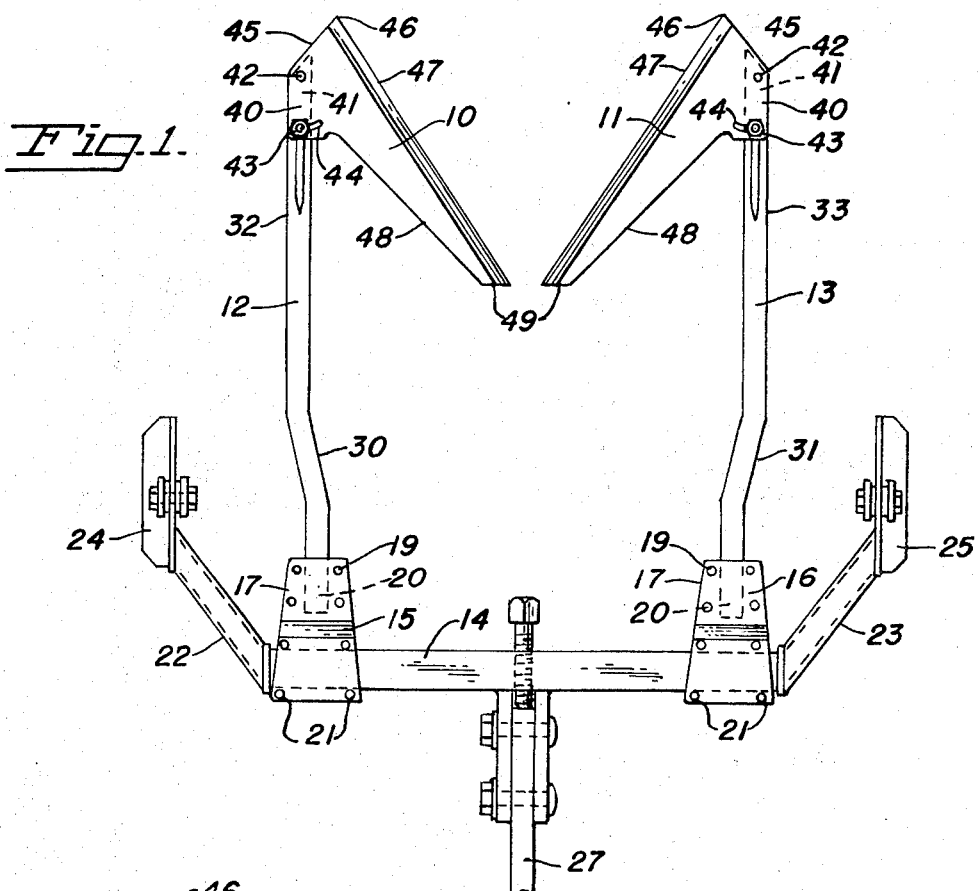
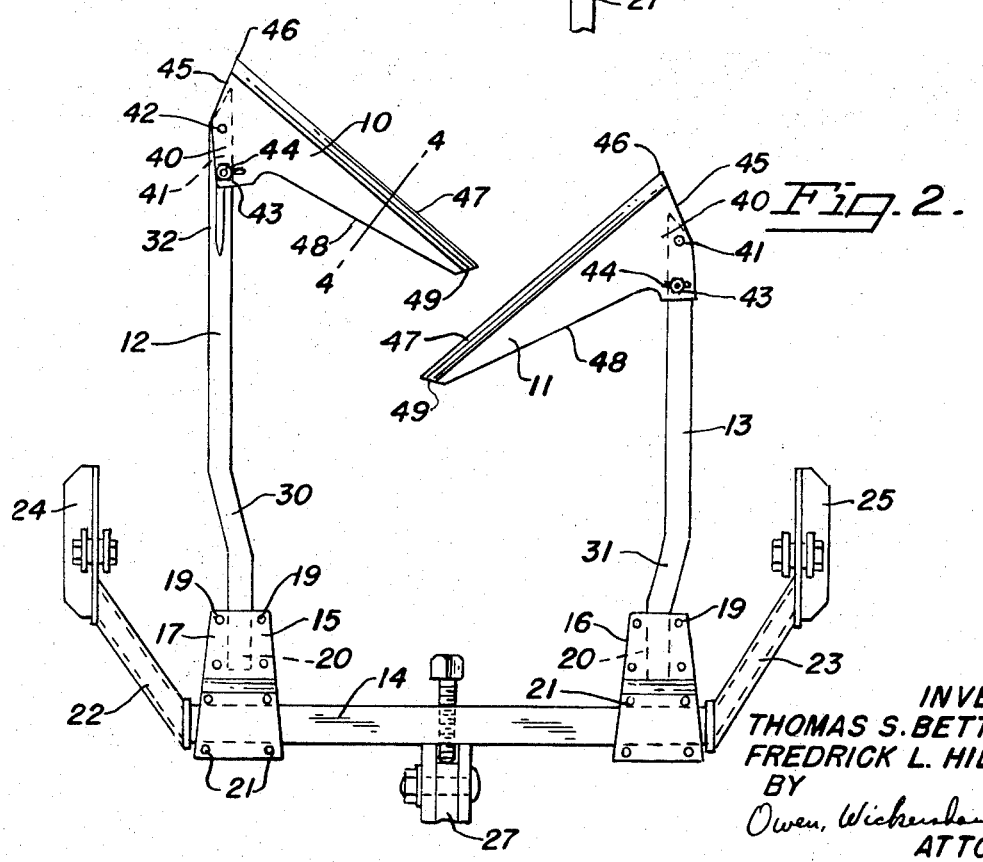
INVENTORS
THOMAS S. BETTENCOURT
FREDRICK L. HILL
BY
Owen, Wickersham & Erickson
ATTORNEYS

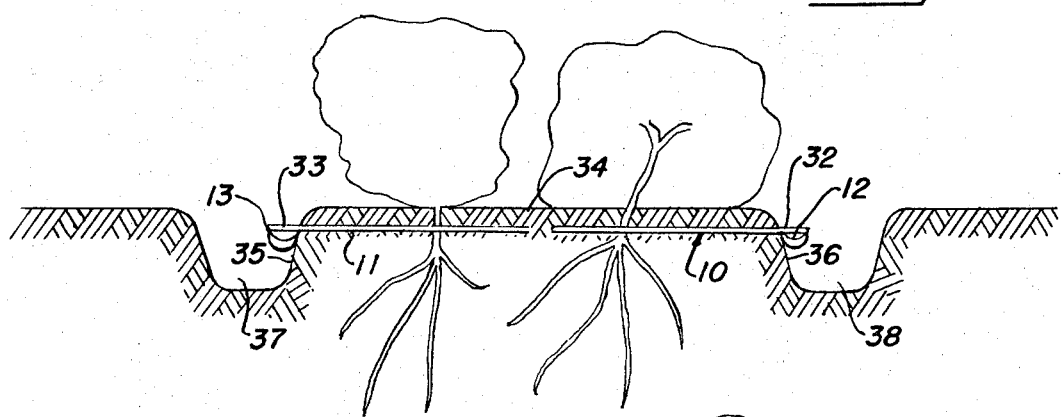
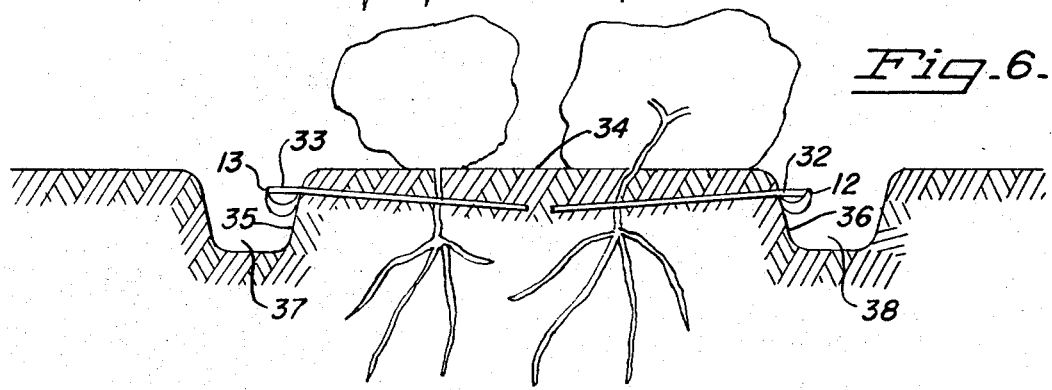
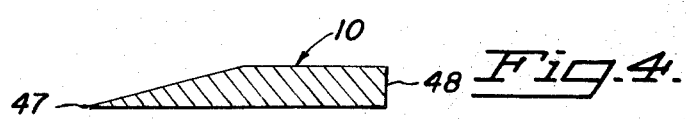
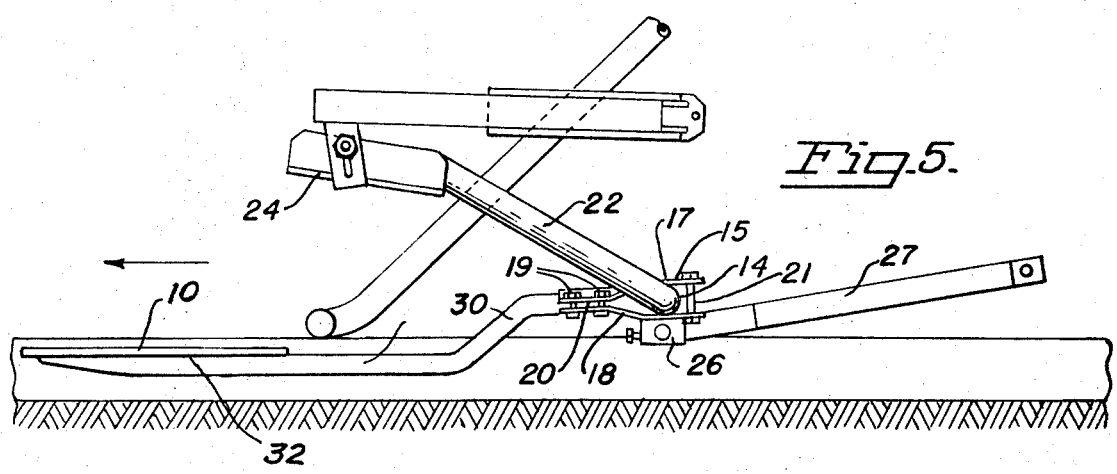
INVENTORS
THOMAS S. BETTENCOURT
FREDRICK L. HILL
BY
Owen, Wickersham & Erickson
ATTORNEYS

CUTTING DEVICE AND METHOD FOR TOMATO HARVESTERS AND THE LIKE

This invention relates to an improved cutting device for tomato harvesters and the like and to an improved cutting method.

Since the advent of mechanical harvesting of tomatoes, numerous problems have arisen; some of the most difficult of these have related to the severing of the tomato plants and weeds from their roots, the main stem generally being severed by a cutting device moving under the ground. Some of the cutting devices have tended to shake the plant so much that many of the tomatoes dropped to the ground and could not be recovered economically, thereby reducing the yield. Some cutting devices have tended to push large quantities of dirt up onto the elevator of the machine, so much so that recovery was hampered and yield reduced either on an absolute basis or per time worked. Some cutting devices have tended to create clods of dirt, which accompanied the tomatoes not only on to the elevator but even to the sorting conveyors. Some cutting apparatus have tended to dive into the ground, thereby creating clods and damaging the harvester, requiring delicate readjustments as well as replacements of parts. Some cutting devices have produced ground waves, which have tended to cause shattering of the fruit. Most cutting devices have been difficult for an operator to observe properly. Most cutting devices cause the top corner of the crops' bed to displace into the furrow ahead of the pickup conveyor, taking fruit with it and permitting vines to not be picked up at that point.

The present invention is intended to solve these problems. Thus, among the objects of the invention are to enable increased fruit recovery, to enable the fruit recovered to be cleaner, to reduce factors causing dirt to be put up into the machine, to prevent the creation of clods, to prevent diving of the cutting apparatus, to minimize ground waves and thereby to minimize fruit shatter, and to give assistance to the operator by providing a visible guide enabling him to keep the cutting apparatus in the proper position, by virtue of the taper-sled effect of the stinger.

A novel feature of this invention and a very important one is a new concept of underground cutting based on the fact that the tomatoes are grown in raised beds between furrows. By utilizing the furrows as defining the beds, supporting device for the cutting mechanism is made to ride outside the ground along the furrows closely adjacent the bed, with the knives in between them and underground. Although the cutting edges are underground, the support for them rides outside the bed on the edges of the bed, (or beyond the edge of the crop in flat plantings where there are no furrows) and the entire width of the bed is cut. Thus, the cutting device traps the top of the bed width and maintains the bed shape while cutting the vines, and it cuts clean across either single row or double row beds. By doing this, it is able to free all the plant stems from roots, even weeds, and to maintain its set depth so that it does not dive. The dirt is kept where it belongs, on the ground. Ground waves are avoided by having only the flat cutting members underground, not their fore-and-aft extending support members, commonly called "stingers."

Outboard stingers, which are clearly visible from the operator's seat, gather and guide the entire vine to the pickup mechanism which follows close behind the cutting blades, so that even vines and fruit that are on the sides of the furrows are picked up. The operator's job is simplified by the visual guides provided outside the ground on the sides of the bed, and so it is easy to keep the harvester pickup in its correct position. Thus it becomes possible for anyone to operate the pickup without a long period of special training.

Other objects and advantages of the invention will appear from the following description of a preferred form thereof.

In the drawings:

FIG. 1 is a top plan view of the cutting apparatus only of a tomato harvester, incorporating the principles of the invention. At the rear a portion leading to the main frame of the harvester is cut off. The blades are arranged for cutting two rows of plants in the same bed.

FIG. 2 is a top plan view similar to FIG. 1 showing a modified type of arrangement of the same apparatus, in which the blades are staggered somewhat so that they overlap, as for cutting a single row of plants in the bed.

FIG. 3 is a diagrammatic representation of the invention showing tomato plants growing in a raised bed with the supporting mechanism or stingers moving down the furrows and lying closely adjacent the bed and with the cutting blades underground extending in from them.

FIG 4 is a view in section of one blade, taken along the line 4—4 in FIG. 2.

FIG. 5 is a view in side elevation of the device, also showing its relation to a small portion of the pickup mechanism for the harvester.

FIG. 6 is a view similar to FIG. 3, with the blades inclined down by rotating their supporting arms.

A harvester according to this invention may be substantially like that shown in U.S. Pat. No. 3,196,954, and the supporting frame and connection to the harvester may be substantially identical to what is shown there. The main difference is in the actual cutting members 10 and 11 and in the rodlike members 12 and 13 which directly support them and are commonly called stingers. The stingers 12 and 13 are secured to a squared shaft 14 by clamps 15 and 16, each of which includes an upper pad 17, a lower pad 18, and bolts 19 that are secured to a flat portion 20 of the stinger and hold it against rotation. Bolts 21 secure the clamps 15 and 16 to the squared shaft 14. The clamps 15 and 16 enable one to set the spacing of the blades 10, 11 from the square shaft 14 and to set the lateral tilt of the blades 11 and 12 and then to hold both, once they are set.

The square shaft 14 is a part of a rigid support assembly having welded to it forwardly and upwardly extending arms 22 and 23 from which extend forward angle irons 24 and 25. At the center of the square shaft 14 there may be a depending ear 26 which is connected to a rearwardly extending threaded shank 27. The shank goes back to a frame connection assembly as shown in U.S. Pat. No. 3,196,954. Since one end of each of the stingers 12 and 13 used in this invention is above ground level and the other end is below ground level, each is provided with an offset portion 30, 31 which extends out both outwardly and downwardly. The forward portions 32, 33 of the stingers 12, 13 are accommodated to the exact size of the raised bed 34 in which the tomatoes are growing, as shown in FIG. 3, so that the stingers 12, 13 ride exactly with their forward part 32, 33 resting on the side walls 35 and 36 thereof above the bottom of the furrows 37, 38. Of course, there is a slight variation and at any one moment the stingers 12, 13 may be entirely out of the ground or may be partly buried, but generally they are in position touching the walls 35, 36 and the bed 34 lies in between them, and they are below the top of the bed. The stingers 12 and 13 are so adjusted by loosening the bolts 21 and sliding the members 16 and 17 along the square tube 14. Also, by a small amount of rotation, the blades 10 and 11 may be slanted, as shown in FIG. 6 and described below.

The cutting blades 10 and 11 are preferably shaped as shown and each comprises an anchor portion 40 which is secured to the stingers 12 and 13 at a flat portion 41 thereof by two securing members 42, 43, the member 42 being a pivot for adjustment by means of an arcuate slot 44 in the blade anchor portion 40 and the bolt 43, enabling one to swing each blade 10, 11 relative to its stinger 12, 13. The angle may be set as shown in FIG. 1 or as shown in FIG. 2.

In FIG. 2 the blades 10 and 11 overlap, as for cutting where only one row of vines is planted, or a weed condition prevails between two rows on the bed in the center of the bed 34, whereas two-row planting is cared for as shown in FIG. 1. The blades 10 and 11 are kept apart, whether they overlap or not, sufficiently so that dirt and trash can easily travel without impediment in between them.

Each blade 10, 11 extends out from the anchor portion 40 with a forward edge 45 extending forwardly to a sharp vertex 46 which must be operated underground in the bed and from there a forward edge 47 comprising a major portion of the blade 10, 11 extends rearwardly at about a 45° angle. If point 46 were to be exposed beyond the edge of the bed, the vine on the edge of the bed would hairpin under the edge 47, causing vine pushing and fruit loss. The edge 45 guides these vines upon the stingers 12 and 13. The rear edge 48 of the blade is adapted simply to provide sufficient strength and width and extends at a slightly different angle, so that the blade 10, 11 is narrower at its outboard end 49 than at its inboard end. The blade is provided with a generally sharp edge 47 and is adapted to move underground. It is substantially flat on top as shown.

By operating in the manner shown in FIG. 3, the objects of the invention are achieved, for the entire bed 34 is kept in between the two stingers 12 and 13. The top of the bed is thereby trapped, and the bed shape is maintained while cutting the vines because there is no real disruption. The thin flat blades 10 and 11 move through the ground, giving it very little disturbance and therefore no noticeable ground wave. Everything is cut because there is nothing in the way and because the ground itself is holding the vines (or even the weeds, for that matter) in place so that the blade simply severs them, much as lather holds a beard in place when a razor is cutting it.

Since the outboard stingers 12 and 13 are visible to the operator, he can know exactly what they are doing at any time, and since they are easily adjusted for height and so on, all these factors are easily dealt with and once set for a particular bed, are readily maintained.

The invention is not confined to use with raised beds or beds separated with furrows. For crops grown on flat sprinkled irrigated land, for example, the stingers operate underground, but beyond the outermost edge of the crop.

By rotating the stingers 12 and 13 in their sockets 16 and 17, the blades 10 and 11 can be slanted for better adaptation in various types of soils. Tipping the tails 49 down, as shown in FIG. 6, will regulate the cutting depths of the blades 10 and 11. This enables adjustment to a V-like shape, shown in FIG. 6, which enables very good vine cutting in all types of conditions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method of harvesting row crops grown in a bed between a pair of furrows providing bed sidewalls, employing a pair of stingers spaced apart slightly more than bed width, said stingers having flat blades extending in toward each other, comprising:
   riding the forward portion of the stingers on said side walls, in said furrows, below the top of the bed, so that their position relative to the top surface of said bed is directly visible, while;
   cutting through said bed with said flat blades, along a substantially continuous flat underground plane extending across the bed, while
   controlling the cutting depth by controlling the position of the stingers relative to the top surface of said bed.

2. A cutting device for harvesters, for use with row crops planted in a relatively flat bed between furrows, comprising:
   a transverse support member;
   a pair of stingers extending forwardly from said support member at opposite sides thereof to extend into said furrows below the top of said bed, each said stinger comprising a fore-and-aft extending rod having an outwardly offsetting portion connecting forward and rear portions that have parallel axes; and
   a pair of flat blades extending in toward each other, each to one side only of a said stinger, and supported by the front ends of said stingers, whereby the blades are underground and cut a plane across the bed beneath the surface, the forward stingers being adapted to ride on bed side walls provided by said furrows, so that the underground depth of said blades can be visually judged, each of said blades having a leading edge that extends forwardly at about 45° from its said stinger a short distance in the direction toward the other stinger, to a sharp vertex lying just to the side of its said stinger and then extends rearwardly about half of the way toward the other stinger at about 45° to the fore-and-aft lines of the stingers.

3. The device of claim 2 wherein the blades are mounted on the stingers for limited swinging movement for adjustment of the angles to vary them a few degrees on both sides of 45°.

4. The device of claim 2 wherein the bottom of the blades is flat and generally horizontally disposed with the upper surface sloping at the forward edge to a thicker rear portion.

5. The device of claim 2 wherein the blades each become narrower from the vertex to the end thereof furthest from its stinger.

6. The device of claim 2 wherein the blades are mounted at the same distance in front of said transverse supporting member, with a narrow gap between them, for harvesting double row crops.

7. The device of claim 2 wherein one blade is mounted further in front of the transverse supporting member than the other, with the inboard ends of the blades overlapping and spaced from each other, for harvesting single row crops.

8. The device of claim 7 wherein the blade closer to the transverse supporting member is so arranged by movement of its stinger relative to said supporting member.

9. The device of claim 2 having means for rotating said stingers relative to said support members, to tilt the blades a few degrees, so that they incline toward a vertex instead of lying on a plane.

10. A method of harvesting row crops grown in a bed between a pair of furrows providing side walls at each side of such bed, employing a pair of stingers spaced apart slightly more than bed width and having flat blades extending in toward each other, and inclined toward a vertex, to make a broad V-like cutting line comprising:
   riding the forward portion of the stingers on said side walls in said furrows, below the top of the bed, while;
   cutting through said bed with said flat blades along a flat underground vee extending across the bed, at the depth where the stingers ride on said side walls; and
   whereby the cutting depth is always known from the height of the stingers, enabling direct visible control of said cutting depth.